US009600772B1

(12) United States Patent
Hilley

(10) Patent No.: US 9,600,772 B1
(45) Date of Patent: Mar. 21, 2017

(54) INFRASTRUCTURE ENABLING INFORMATION SYSTEMS TO BE AWARE AND SELF-AWARE

(71) Applicant: John Hilley, Great Falls, VA (US)

(72) Inventor: John Hilley, Great Falls, VA (US)

(73) Assignee: Omniphysical LLC, Great Falls, VA (US)

( * ) Notice: Subject to any disclaimer, the term of this patent is extended or adjusted under 35 U.S.C. 154(b) by 443 days.

(21) Appl. No.: 14/140,265

(22) Filed: Dec. 24, 2013

Related U.S. Application Data

(60) Provisional application No. 61/819,309, filed on May 3, 2013.

(51) Int. Cl.
*G06N 5/02* (2006.01)

(52) U.S. Cl.
CPC .................................. *G06N 5/025* (2013.01)

(58) Field of Classification Search
None
See application file for complete search history.

(56) References Cited

U.S. PATENT DOCUMENTS

| | | | |
|---|---|---|---|
| 6,636,781 B1 | 10/2003 | Shen et al. | |
| 7,853,786 B1 | 12/2010 | Fultz et al. | |
| 7,958,077 B2 | 6/2011 | Vescovi et al. | |
| 2010/0088258 A1 | 4/2010 | Oaten et al. | |
| 2011/0131162 A1 | 6/2011 | Kaushal et al. | |

OTHER PUBLICATIONS

Provine, et al., "Ontology-based methods for enhancing autonomous vehicle path planning", Robotics and Autonomous Systems, 49.1, 2004, pp. 123-133.*
Dautov, et al., "Addressing Self-Management in Cloud Platforms: A Semantic Sensor Web Approach", Proceedings of the 2013 International Workshop on Hot topics in Cloud Services. ACM, 2013, pp. 11-18.*

(Continued)

*Primary Examiner* — Kakali Chaki
*Assistant Examiner* — Eric Nilsson
(74) *Attorney, Agent, or Firm* — Brake Hughes Bellermann LLP

(57) ABSTRACT

Methods and systems enable a symbol-based descriptive information system to acquire various forms of awareness, including self-awareness. The methods and systems include an operations specification of awareness for the system, a process for acquiring awareness, and special symbols that support the various forms of awareness. For example, a system may include at least one processor and memory storing a database that includes symbols, definitions of symbols, and processing rules. One symbol in the database may be an awareness symbol and another may be a database symbol. The system may also include memory storing instructions that, when executed, cause the system to acquire awareness of at least one symbol from the database, acquire awareness of the system being aware using the awareness symbol, and acquire awareness of the system's information content and capabilities using the database symbol. The awareness and database symbols allow the system to gain the capability of self-awareness.

20 Claims, 9 Drawing Sheets

(56) References Cited

OTHER PUBLICATIONS

Simon, Herbert, "Studying Human Intelligence by Creating Artificial Intelligence: When considered as a physical symbol system, the human brain can be fruitfully studied by computer simulation of its processes", American Scientist : vol. 69, No. 3, May-Jun. 1981, pp. 300-309.
Sloman, Aaron, "The Structure and Space of Possible Minds", The Mind and the Medicine: philosophical aspects of Artificial Intelligence, 1984, 8 pages.
Stojanovic, et al., "The role of ontologies in autonomic computing systems", IBM Systems Journal 43.3, 2004, pp. 598-616.
Vollmer, et al., "Autonomous Rule Creation for Intrusion Detection", IEEE Symposium on Computational Intelligence in Cyber Security (CICS), IEEE, Apr. 2011, 8 pages.
U.S. Appl. No. 14/561,199, filed Dec. 4, 2014.
Notice of Allowance received for U.S. Appl. No. 14/561,199, mailed Apr. 7, 2016, 10 pages.

\* cited by examiner

```
getMeaning( parameterSymbol ) { meaning="";

definition = getDefinition (parmameterSymbol);
    for (i=0 ; i < definition.number_of_symbols ; i++) {
        if (definition.primitive == TRUE)
            stringConcat (meaning, definition.symbol[i]);
        else
            stringConcat (meaning, getMeaning(definition.symbol[i]);
    }
    return (meaning);
}
```

FIG. 3B

Database 140

Symbols 142

{ $S_1, S_2, S_4, S_5, S_6, S_7, S_{11}, S_{12}, S_{13}, S_{15}, S_{23}, S_{AWARE}, S_{ALGO}, S_{SYSTEM}, S_{ALGO/1},$
$S_{AWARE/1}, S_{AWARE/ALGO}, S_{AWARE/ALGO/1}, S_{AWARE/AWARE/ALGO}, S_{AWARE/SYSTEM}; ...$ }

Definitions 144

{ $D_1 : S_2, S_{12}, S_{23}$ ;
  $D_2 : S_5, S_{12}$ ;
  $D_4 : S_4$ ;
  $D_5 : S_5$ ;
  $D_6 : S_6$ ;
  $D_7 : S_{13}$ ;
  $D_{11} : S_{15}$ ;
  $D_{12} : S_6, S_7$ ;
  $D_{13} : S_{13}$ ;
  $D_{15} : S_{15}$ ;
  $D_{23} : S_4, S_{11}$ ;
  $D_{AWARE} : S_{ALGO}$ ;
  $D_{ALGO} : R_1, R_2, R_3$ ;
  $D_{SYSTEM} : S_1, S_2, S_4, S_5, S_6, S_7, S_{11}, S_{12}, S_{13}, S_{15}, S_{23}, R_1, R_2, R_3, R_4, R_5,$
      $S_{AWARE}, S_{ALGO}, S_{SYSTEM}, S_{ALGO/1}, S_{AWARE/1}, S_{AWARE/ALGO}, S_{AWARE/ALGO/1},$
      $S_{ALGO/ALGO}, S_{AWARE/SYSTEM}, D_1, D_2, D_4, D_5, D_6, D_7, D_{11}, D_{12}, D_{13}, D_{15},$
      $D_{23}, D_{AWARE}, D_{ALGO}, D_{ALGO/1}, D_{AWARE/1}, D_{ALGO/ALGO}, D_{AWARE/ALGO},$
      $D_{AWARE/SYSTEM}$ ;
  $D_{AWARE/1} : S_{ALGO/1}$ ;
  $D_{ALGO/1} : S_1 \rightarrow R_1, R_2, R_3$ ;
  $D_{AWARE/ALGO} : S_{ALGO/ALGO}$ ;
  $D_{ALGO/ALGO} : S_{ALGO} \rightarrow R_1, R_2, R_3$ ;
  ...
}

Rules 146

$$S_{AWARE} = D_{AWARE} (S_{ALGO})$$

$$S_{ALGO} = D_{ALGO}(R_1, R_2, R_3)$$

$$M(S_{AWARE}) = R_1, R_2, R_3$$

FIG. 6

$$S_{SYSTEM} = D_{SYSTEM} (S_1, S_2, S_4, S_5, S_6, S_7, S_{11}, S_{12}, S_{13}, S_{15}, S_{23}, R_1, R_2, R_3, R_4, R_5,$$
$$S_{AWARE}, S_{ALGO}, S_{SYSTEM}, S_{ALGO/1}, S_{AWARE/1}, S_{AWARE/ALGO}, S_{AWARE/ALGO/1},$$
$$S_{ALGO/ALGO}, S_{AWARE/SYSTEM}, D_1, D_2, D_4, D_5, D_6, D_7, D_{11}, D_{12}, D_{13}, D_{15},$$
$$D_{23}, D_{AWARE}, D_{ALGO}, D_{ALGO/1}, D_{AWARE/1}, D_{ALGO/ALGO}, D_{AWARE/ALGO},$$
$$D_{AWARE/SYSTEM}, \ldots)$$

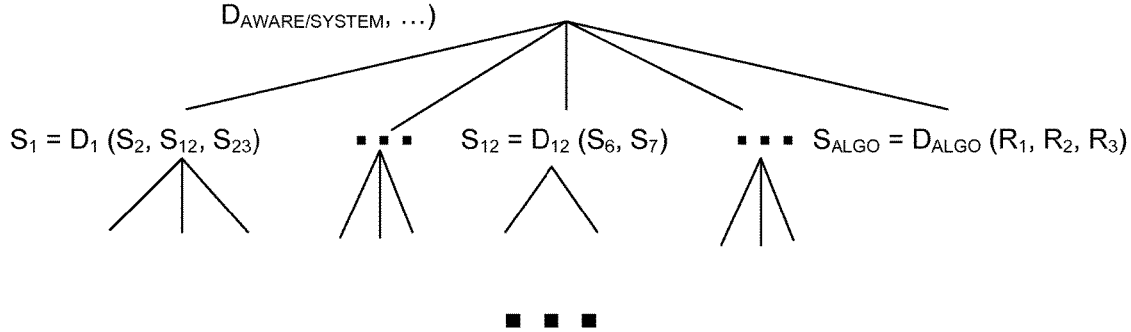

$$S_1 = D_1 (S_2, S_{12}, S_{23}) \quad \bullet\bullet\bullet \quad S_{12} = D_{12} (S_6, S_7) \quad \bullet\bullet\bullet \quad S_{ALGO} = D_{ALGO} (R_1, R_2, R_3)$$

$$M(S_{SYSTEM}) = S_5, S_6, S_{13}, S_6, S_{13}, S_4, S_{15}, \ldots, S_6, S_7, \ldots R_1, R_2, R_3, \ldots$$

FIG. 7

$$S_{AWARE/1} = D_{AWARE/1} (S_{ALGO/1})$$

$$S_{ALGO/1} = D_{ALGO/1} (S_1 \rightarrow R_1, R_2, R_3)$$

$$M(S_{AWARE/1}) = S_1 \rightarrow R_1, R_2, R_3$$

FIG. 8

$$S_{AWARE/ALGO} = D_{AWARE/ALGO} (S_{ALGO/ALGO})$$

$$S_{ALGO/ALGO} = D_{ALGO/ALGO} \text{ where } D_{ALGO} = R_1, R_2, R_3$$

$$M(S_{AWARE/ALGO}) = R_1, R_2, R_3 \rightarrow R_1, R_2, R_3$$

FIG. 9

INFRASTRUCTURE ENABLING INFORMATION SYSTEMS TO BE AWARE AND SELF-AWARE

RELATED APPLICATIONS

This application claims priority under 35 U.S.C. §119 to Provisional Patent Application Ser. No. 61/819,309, entitled "AN INFRASTRUCTURE ENABLING INFORMATION SYSTEMS TO BE SELF-AWARE" filed on May 3, 2013. The subject matter of this earlier filed application is hereby incorporated by reference.

TECHNICAL FIELD

The subject matter of the present disclosure relates to an information system infrastructure.

BACKGROUND

Humans are capable of two types of awareness. The first is physical awareness made possible by our sensory and nervous systems. For example, when a pin pricks our finger, we are physically aware of the pain. The second type of awareness is descriptive awareness that includes the ability to describe the prick. In other words, not only are we physically aware of the pain, but we also descriptively aware, using descriptive information to describe the prick as painful. Descriptions are meanings that arise from defined relations among symbols within a symbol-based computational system. Although current computational systems can process vast amounts of information, these systems have lacked the structures and operations that support self-awareness and other forms of descriptive awareness.

SUMMARY

In one general aspect, a computer-implemented method for acquiring awareness includes accessing a data store that includes symbols, definitions of symbols, and processing rules, one symbol being an awareness symbol and one symbol being a database symbol, and acquiring awareness of at least one symbol from the data store. Acquiring awareness of at least one symbol may include a) obtaining a first definition of the symbol from the data store, the first definition including at least one other symbol from the data store, and b) establishing a meaning of the symbol by reducing the first definition to primitives. Reducing the definition to primitives may include i) obtaining a second definition for the other symbol in the first definition, ii) reducing the second definition to primitives if the second definition is not primitive. That is, reducing any definition to primitives may include replacing each non-primitive symbol in the definition with the non-primitive symbol's definition until all symbols in the definition are reduced to primitives.

Implementations can include one or more of the following features. For example, the at least one symbol may be the awareness symbol, and by acquiring awareness of the awareness symbol, the information system acquires awareness of its being aware. In such implementations, the definition of the awareness symbol may reduce to processing rules from the data store that cause the information system to perform the operations of a) and b) above. As another example, the at least one symbol is the database symbol, and by acquiring awareness of the database symbol, the information system acquires awareness of all its content and capabilities. In such implementations, the definition of the database symbol may reduce to the symbols, definitions, and processing rules included in the data store.

In some implementations a definition for a particular symbol is primitive when the definition is the particular symbol itself or the definition is marked as primitive in the data store. In some implementations, the data store further includes a symbol awareness symbol corresponding to a particular symbol and the at least one symbol is the symbol awareness symbol and, by acquiring awareness of the symbol awareness symbol, the information system acquires awareness of its capability to be aware of the meaning of the particular symbol. In some implementations, the data store further includes an aware of awareness symbol and the at least one symbol is the aware of awareness symbol, and by acquiring awareness of the aware of awareness symbol, the information system acquires awareness of being aware of being aware of.

In another general aspect, a computer system for acquiring awareness includes at least one processor and a data store storing symbols, definitions of symbols, and processing rules, one symbol being an awareness symbol and one symbol being a database symbol. The system also includes a memory storing instructions that, when executed by the at least one processor, cause the system to perform operations. The operations can include acquiring a first awareness, the first awareness being an awareness of a particular symbol from the data store. The operations can also include acquiring a second awareness using the awareness symbol, the second awareness being an awareness that the system is aware. The operations may also include acquiring a third awareness using the database symbol, the third awareness being an awareness of the system's information content and capabilities.

Implementations can include one or more of the following features. For example, the system may acquire self-awareness as a result of acquiring the second awareness and the third awareness. As another example, acquiring the first awareness can include a) obtaining a first definition of the particular symbol from the data store, the first definition including at least one other symbol, and b) establishing a meaning of the particular symbol by reducing the first definition to primitives. Reducing the definition to primitives if it is not already primitive can include i) obtaining a second definition for the at least one other symbol in the first definition, ii) reducing the second definition to primitives if the second definition is not primitive. Reducing the second definition to primitives if it is not primitive can include obtaining a third definition for a non-primitive symbol in the second definition and reducing the third definition to primitives if the third definition is not primitive. In some implementations, by establishing the meaning of the symbol the system acquires awareness of the particular symbol.

In some implementations, the particular symbol is the awareness symbol, and acquiring the first awareness using the awareness symbol causes the system to acquire the second awareness. In such implementations, a meaning of the awareness symbol is a set of processing rules that represent operations a) and b) above. In some implementations, a primitive includes a symbol that has a corresponding definition that is the symbol itself. In some implementations, at least one primitive is marked as primitive in the data store.

In some implementations, the particular symbol is the database symbol and a meaning of the database symbol includes the symbols, definitions, and processing rules in the data store. In such implementations, acquiring the first awareness using the database symbol causes the system to acquire the third awareness. In some implementations, the operations may also include receiving a new normal symbol and a corresponding symbol definition, updating the data store with the new symbol and the corresponding symbol definition, and updating a definition of the database symbol to include the new symbol and the corresponding symbol definition.

The data store may also store a symbol awareness symbol for at least one symbol. In some implementations, the particular symbol is the symbol awareness symbol, and the operations may further include acquiring the first awareness using the symbol awareness symbol for the at least one symbol, which results in the system acquiring a fourth awareness, the fourth awareness being awareness of the capability to be aware of a meaning of the at least one symbol.

As another example, the data store may store an aware of awareness symbol, In such implementations, the particular symbol is the aware of awareness symbol, and operations may also include acquiring the first awareness using the aware of awareness symbol, which results in the system acquiring a fifth awareness, the fifth awareness being awareness of being aware of being aware.

In another general aspect, a computer program product being tangibly embodied on a computer-readable storage device can be configured to store instructions that, when executed, cause a computing system to perform any of the disclosed methods.

Disclosed implementations specify the ways by which an information system may gain the capabilities of awareness including awareness of the meaning of any of its symbols, awareness of itself as the aware entity, awareness of all of its information and operations, awareness that it is aware of the meaning of any of its symbols, and awareness ad infinitum (aware of being aware of being aware and on and on). A fully self-aware system is one that is aware of itself as the aware system as well as aware of its information and operations, allowing it to be self-identifying and self-inspecting. The infrastructures enabling awareness capabilities can be used in a broad spectrum of applications, including in intelligent systems directing mechanical systems deployed where direct human presence would be dangerous or impossible. A self-aware system may be used in military, industrial, or extra-terrestrial applications that experience information, process the information, and that benefit from being aware and self-aware. For example, a robot or rover on an extra-terrestrial mission may use its real-time awareness of the environment, its awareness of its mission goals, and its self-awareness of its own information and capabilities to take appropriate actions without need for ground-based guidance. An entirely different use of the invention relates to applications in cognitive science. Because self-awareness and the other awareness capabilities are key properties of mind, the infrastructure can be used as the foundation for simulations and performances of mental activities using universal computation devices.

The details of one or more implementations are set forth in the accompanying drawings and the description below. Other features will be apparent from the description and drawings, and from the claims.

BRIEF DESCRIPTION OF THE DRAWINGS

FIG. 3B is pseudo-code illustrating an example process for acquiring the forms of awareness, according to an implementation.

FIG. 4 is an example data store supporting an informational system of awareness, according to an implementation.

FIG. 6 is an example of acquiring awareness of being aware using the process for acquiring awareness and the data store of FIG. 4.

FIG. 7 is an example application of acquiring awareness of content and capabilities using the process for acquiring awareness applied to the data store of FIG. 4.

FIG. 8 is an example application of acquiring awareness of being aware of a particular symbol using the data store of FIG. 4.

FIG. 9 is an example application of acquiring awareness ad infinitum (aware of being aware of being aware and on and on) using the data store of FIG. 4.

DETAILED DESCRIPTION

The systems and methods described herein can be used to enable the capabilities of awareness and self-awareness in a symbol-based descriptive information system. A purely descriptive system is comprised of symbols, definitions, and processing rules, and the meanings, or fully-expanded definitions that result from application of the processing rules to the symbols and their definitions. For a descriptive system, being aware means the system can establish the meaning of a symbol in the information terms that constitute the system. Specifically, disclosed implementations include systems and methods that allow a symbol-based information system to acquire awareness of the meaning of particular symbols, gain awareness of itself as being aware, gain awareness of all of its descriptive content and processing capabilities, gain awareness of its capability to be aware of particular information, and the capability to be aware of being aware ad infinitum, as will be discussed in more detail below. These various forms of awareness are information capabilities of a pure descriptive system. Disclosed embodiments become aware and self-aware in terms of the descriptive content of the system itself as an information entity. Disclosed implementations use a well-defined specification of a basic awareness engine, the manner in which different kinds of awareness can be generated, and the manner in which a self-contained system assures the accuracy of its awareness.

To support the capabilities described above an information system includes at least two types of symbols: special symbols and normal symbols. Special symbols are those that constitute the infrastructure supporting the symbol-based descriptive information system. The meaning of a special symbol is the processing operations, or rules, that support particular capabilities represented by the special symbol. The meaning of a special symbol is specific and fixed in order to assure the functioning of the infrastructure of the descriptive information system. The special symbols can be stored in a read-only, persistent portion of the data store to protect the system from disruption. Normal symbols are open to assignment of descriptive content. They provide the representational vehicles for descriptive content to be processed by the infrastructure—content of which the descriptive information system can be aware. Normal symbols can be stored in a 'read-write' portion of the data store.

Figure 1:
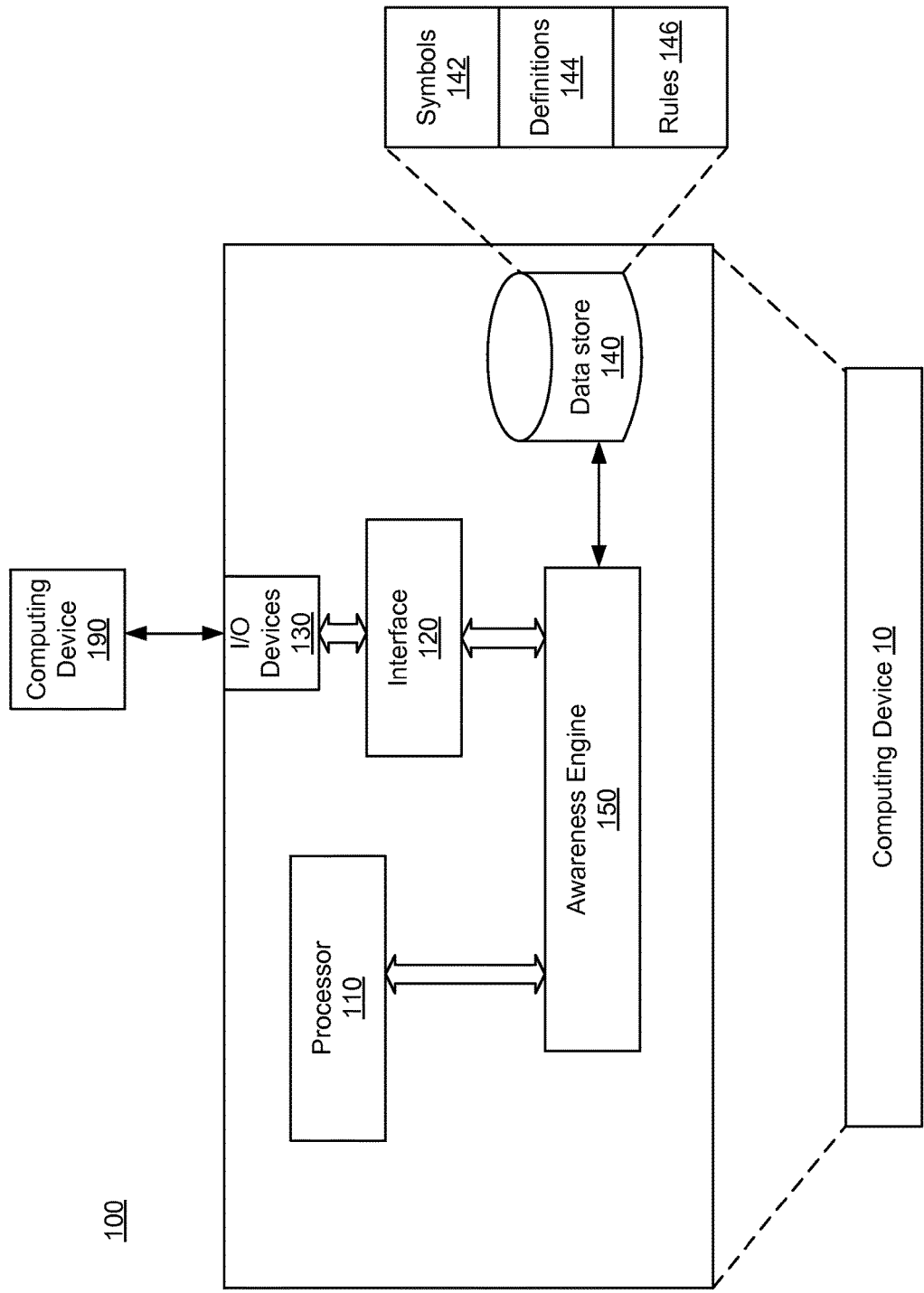
FIG. 1 is a block diagram that illustrates an example of a descriptive information system with infrastructure supporting awareness.

FIG. 1 is a schematic diagram that illustrates an information system 100 that can acquire self-awareness and the other capabilities of awareness. The information system 100 can be embodied, for example, on one or more computing devices 10. The information system 100 can be computed by any universal computational device such as a digital computer, for example, a personal computer, a notebook, a netbook, a tablet, a server, a mainframe, or some other similar computing device. The information system 100 may also include a combination of one or more computing devices 10. For example, two or more computing devices 10 may be physically or logically distinct from each other but in communication with each other via a communications network (not shown). Network data can flow through a variety of mechanisms: communication software and hardware, telephone wires, broadband cable, wireless and microwave transmission units, satellite, fiber optics, and so on. The network can include one or more segments and/or can have portions based on various protocols such as Internet Protocol (IP) and/or a proprietary protocol. The network can include at least a portion of the Internet. In some implementations, the network can include multiple computing devices and/or multiple server devices.

The computing device 10 can include one or more processors 110 configured to execute one or more machine executable instructions or pieces of software, firmware, or a combination thereof. Processor 110 may be any hardware device used to execute binary computer commands. The computing device 10 can include one or more computer memories, such as a main memory, configured to store data, either temporarily, permanently, semi-permanently, or a combination thereof. The memory may include volatile memory, non-volatile memory, or a combination thereof. At least some of the memory may be used as storage medium capable of storing data in a semi-permanent or substantially permanent form. For example, computing device 10 may include a data store 140 that stores the descriptive content of the system 100. The data store 140 can be a flat file, a relational database, a hierarchical database, or any other type of file or data store capable of storing and retrieving information. The foundation elements of a symbol-based information system include symbols, definitions of symbols in terms of symbols, the ensuing linkages among symbols, and rules for processing symbols. Thus the data store 140 may store descriptive content that includes symbols 142, definitions 144, and rules 146. A symbol may have a corresponding definition that is composed of one or more of symbols 142. The meaning of a particular symbol is derived by fully expanding its definition in terms of symbols to which its definition is linked. The rules 146 are rules for processing the symbols 142 and for the basis of the awareness engine 150. FIG. 4 illustrates one example of symbols 142, definitions 144, and rules 146. It is understood that the symbols, definitions, and rules depicted in FIG. 4 are limited in number for the sake of brevity and illustration and that the data store 140 may include any number of symbols, definitions, and rules, depending on the purpose and function of the information system. Thus, implementations are not limited to the number or names of symbols illustrated in FIG. 4.

The computing device 10 may also include an awareness engine 150 that enables the system 100 to acquire different forms of awareness. The awareness engine 150 may be stored in a main memory, in a storage medium, or in a combination of these. The awareness engine may use the processor 110 and the information in data store 140 to perform operations that enable the system 100 to acquire a variety of forms of awareness, as will be explained in more detail with regard to FIG. 2. Computing device 10 may also include input-output (I/O) devices 130 that allow the computing device 10 to provide information to and receive information from one or more computing devices 190 or other users. For example, I/O devices 130 may include network ports, keyboards, monitors or other display devices, printers, speakers, touch screens, etc. In some implementations, computing device 190 may represent an intelligent system that gathers information and provides the information, in the form of symbols 142 and definitions 144, to computing device 10. In some implementations, a user may provide the information to computing device 190 and/or computing device 190 may gather data and generate the information itself. In some implementations computing device 190 may be in communication with computing device 10 over a network, which may include local area networks, wide area networks, the Internet, or any of the networks described above. Computing device 10 may also include interface 120. Interface 120 may direct certain input to the awareness engine 150 and may provide data from the awareness engine 150 to output devices 130. In some implementations, interface 120 may be optional or may be incorporated into awareness engine 150. In other words, the awareness engine 150 may receive input directly from and may provide data directly to I/O devices 130. Computing device 10 may also include an operating system (not shown). Of course, the computing device 10 may include one or more other hardware or software components not shown in FIG. 1.

Figure 2:
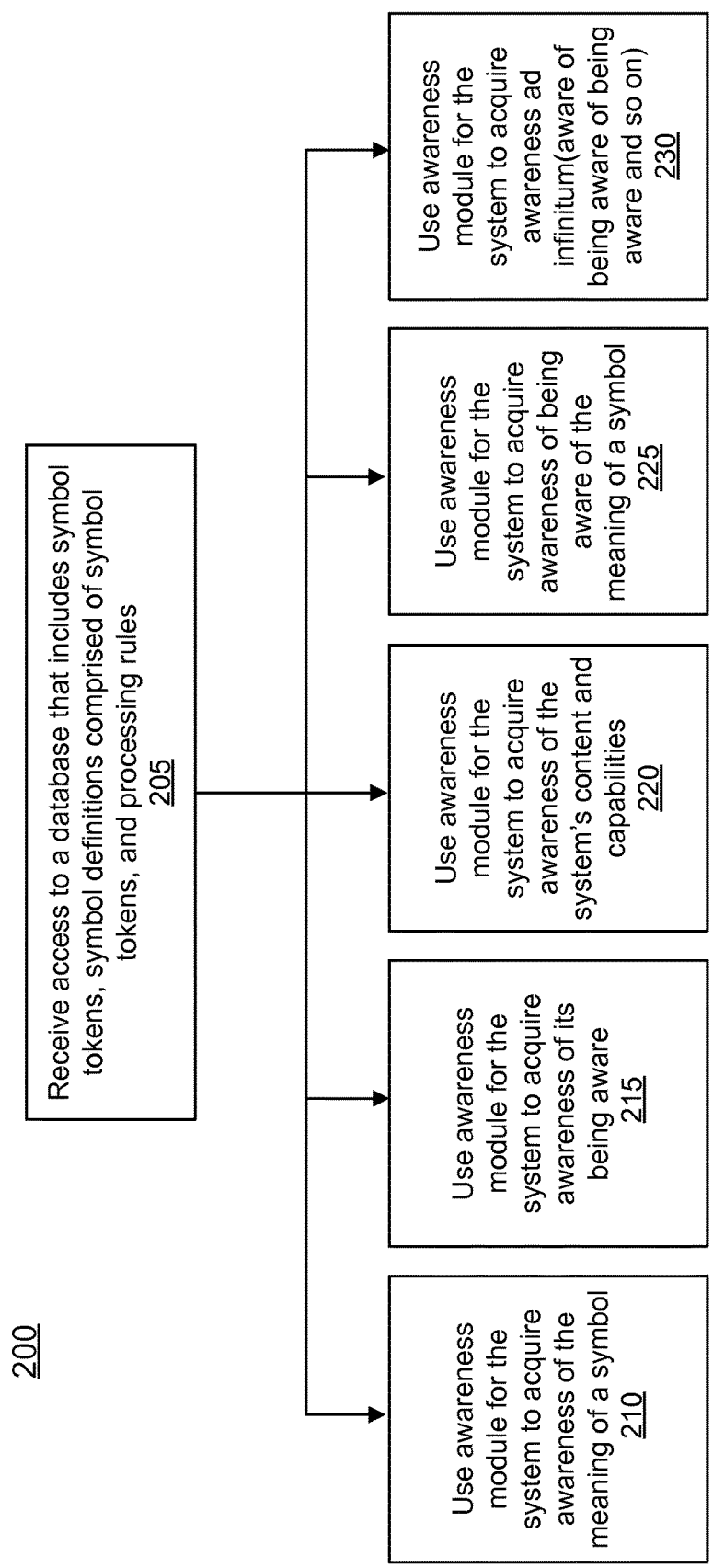
FIG. 2 is a flowchart illustrating an example process for acquiring different forms of awareness, according to an implementation.

FIG. 2 is a flowchart illustrating an example process 200 for acquiring different forms of awareness. Process 200 may be performed by a symbol-based information system, such as computing device 10 of FIG. 1. Once the information system gains the capabilities of awareness, the information system may be aware of any information in the system, including information about itself. The infrastructure for acquiring awareness uses a set of processing rules and special symbols that enable corresponding capabilities of awareness. Accordingly, the symbol-based information system may receive access to a database that includes symbol tokens, symbol definitions of symbols, and processing rules. (205). In some implementations, the symbols need not be assigned particular content, allowing the information system to support the capabilities of awareness for any subsequent assignments of specific content. The symbols may include the special symbols. Special symbols are symbols that support the infrastructure of awareness by allowing the system to acquire self-awareness and other forms of awareness. With access to the database, the information system may acquire different forms of awareness.

For example, the system may acquire awareness of a particular symbol from the database (210). This may be referred to as general awareness, or being aware of information. The system may acquire awareness of a particular symbol when it determines the meaning of the symbol in the terms of the system. The information system may determine the meaning of a symbol using a process for acquiring awareness, also referred to as an awareness algorithm. The process for acquiring awareness may obtain a symbol from the database, obtain the definition for the symbol from the database, and expand the definition through an iterative process until only primitives are left in the definition. The process for acquiring awareness may be represented by rules in the database, and is explained in more detail in relation to FIGS. 3A and 3B.

The system may also acquire awareness of its being aware (215). The system's awareness of its capability to be aware is a first requirement for the information system to acquire self-awareness. The capability enabling the system to be aware is the capability to generate a symbol's meaning or fully expanded definition. This capability may be represented by the rules in the database. Thus, to enable the information system to acquire awareness of its capability of awareness, one of the symbols in the database may have a definition that, when fully expanded, represents the particular rules of processing by which a symbol's definition is fully expanded. This symbol is a special symbol referred to as the awareness symbol. The awareness symbol is a symbol-based representation that the system has the capability of awareness. That is, the awareness symbol represents that the system has the ability to establish a symbol's meaning by fully expanding the symbol's definition. The $S_{AWARE}$ symbol of FIG. 4 is one example of an awareness symbol. The particular rules by which a symbol's definition is fully expanded may collectively be referred to as the awareness algorithm. In some implementations the awareness algorithm may be represented by a symbol, for example the $S_{ALGO}$ symbol of FIG. 4. Just as it can for any symbol, the system may use the algorithm of awareness to fully expand the definition of $S_{AWARE}$. In determining the meaning of $S_{AWARE}$, the system becomes aware of the process by which it becomes aware, e.g., as represented in the processing rules in the database. Thus, the system gains awareness of its being aware. We can represent the ability of the system to be aware of its capability of awareness by the symbol $S_{AWARE/ALGO}$ (e.g., applying the algorithm of awareness to the $S_{ALGO}$ special symbol).

FIG. 6 illustrates an example of acquiring awareness of being aware. $S_{AWARE}$ is the symbol representing the system's capability of awareness. That capability rests on the algorithm of awareness which may be represented by $S_{ALGO}$. This algorithm is the means by which a symbol's definition is fully expanded using the processing rules as represented by $R_1$, $R_2$, and $R_3$ in the example of FIG. 4. Processing rules are algorithmic instructions for manipulating symbols and can thus be executed on any universal computing device such as a digital computer. For example, rules could include: $R_1$ that fetches a symbol (e.g., the original symbol) and its definition from the data store; $R_2$ that determines whether the definition is primitive and, if not, replaces each symbols in the definition with that symbol's definition until all symbols in the definition are reduced to primitives; and $R_3$ that concatenates the primitive symbols as the meaning of the original symbol. Symbols such as $R_1$, $R_2$, $R_3$, etc. are primitives, each of which represents a well-defined processing rule. Although the example of FIG. 4 uses a symbol $S_{ALGO}$ to represent the algorithm of awareness, in some implementations the $S_{AWARE}$ symbol may represent the algorithm of awareness. In other words, the definition of $S_{AWARE}$ may be "$R_1$, $R_2$, $R_3$" or any definition that fully expands to the rules defining the algorithm of awareness.

Also, because $S_{AWARE}$ is defined so that its meaning is the computational means of the system's awareness, it is an accurate description. As a system whose information exists in the defined symbols constituting the system, the accuracy of the content of its awareness is established internally. The accuracy of the system's awareness is assured by referencing the actual means of its aware capabilities.

The system may also acquire awareness of its content, including its capabilities (220). Awareness of all of its information is a second requirement for the information system to have self-awareness. Thus, once the system acquires awareness of its being aware and awareness of all of its information, it is self-aware. To enable the capability to be aware of all content, the informational system may include a database symbol. The database symbol is a symbol-based method of representing the descriptive content of the system: the symbols, definitions, and processing rules. The database symbol is another special symbol. The $S_{SYSTEM}$ symbol of FIG. 4 is one example of a database symbol. To acquire awareness of its content, the information system may determine the meaning of the $S_{SYSTEM}$ symbol. All of the content and processing capabilities of the system are either themselves primitives or expressible as primitives. A symbol is primitive if its definition is the symbol itself (for example in FIG. 5, $S_{13}=D_{13}(S_{13})$). Other symbols, such as $S_{SYSTEM}$, $S_{AWARE}$, and $S_1$, are not primitives because their definitions are comprised of other symbols. Each of their definitions can be fully expanded until the meaning of the symbol is expressed in terms of primitives. For the system to gain awareness of its own content and processing capabilities, it can apply the algorithm of awareness to fully expand $S_{SYSTEM}$, the symbol which represents all the content and processing capabilities of the descriptive system (all contained in the data store). As shown in FIG. 7, the system calls $S_{SYSTEM}$ and then $D_{SYSTEM}$ which is comprised of symbols, definitions, and processing rules derived from appropriately applying processing rules to a symbol and its definition. Each of the symbols, including those representing processing rules, is well-defined in the sense that it is a primitive or is capable of being reduced to primitives. The system gains awareness of its own content and capabilities by establishing the meaning of $S_{SYSTEM}$. That meaning is just the symbols, definitions, and processing rules of the system derived and conserved in the data store. Of course, the meanings of all non-primitive symbols can be reduced to and reported as primitives. We can represent the system's ability to aware of all of its content and capabilities by the symbol $S_{AWARE/SYSTEM}$.

By generating the meaning of $S_{SYSTEM}$, the system gains awareness of itself in terms of its symbols, definitions, and processing rules. The description of the system is accurate because its meaning is the system's full descriptive content and processing capabilities. FIG. 7 illustrates an example of acquiring awareness of all content. Thus, FIGS. 6 and 7 together allow the information system to become self-aware.

The system may also acquire awareness of its being aware of the meaning of a particular symbol (225). In this form of awareness, the system is aware of its capability to be aware of a particular symbol's meaning. In other words, the system is aware of its capability to establish the meaning of a particular symbol. For example, the system may have a symbol awareness symbol that is defined so that its meaning is the capability through which the system gains awareness of a particular symbol, or the awareness algorithm applied to the particular symbol. For example, the system may include any number of normal symbols generally designated by symbol $S_1$ and another symbol $S_{AWARE/1}$, where the meaning of the $S_{AWARE/1}$ symbol is the capability though which the system gains awareness of the $S_1$ symbol. This meaning may also be represented by $S_{ALGO/1}$ using a parameter of $S_1$. By generating the meaning of $S_{AWARE/1}$ the system becomes aware of its capability of being aware of symbol $S_1$. Because the particular description of which the system is aware is arbitrary and because the system uses the same algorithm to gain awareness of any description, the approach can be applied to any of the system's symbols, including the special symbols and normal symbols. FIG. 8 illustrates an example of acquiring awareness of being aware of normal symbol $S_1$. We can represent the system's capability to be aware of its awareness of any of its symbols by the symbol $S_{AWARE/ALGO/1}$.

For example, if the system applies this approach to variants of the $S_{AWARE}$ symbol, the system may acquire awareness of is being aware of its being aware of its being aware ad infinitum (230). Previously, the symbol $S_{AWARE}$ was introduced, enabling the system to be aware of being aware. $S_{AWARE/ALGO}$ may represent this capability, that the system has the capability to be aware of its awareness. The $S_{AWARE/ALGO}$ symbol is an example of an aware of awareness symbol. An aware of awareness symbol may be another special symbol. The system may include an infinite number of aware of awareness symbols, each representing a level of being aware of being aware. At a primary or initial level, the aware of awareness symbol is defined so that its meaning is the computational means by which the system becomes aware of its being aware. Just as it can for any symbol, the system can gain awareness of this symbol (e.g., $S_{AWARE/ALGO}$) by computing its expanded definition, thus becoming aware of its awareness of its awareness which can be represented by $S_{AWARE/AWARE/ALGO}$. The system may generate any degree of awareness of its awareness by the introduction of an appropriate symbol and the application of the awareness algorithm by which the system gains awareness of any symbol.

As illustrated by FIG. 2, the symbol-based information system may acquire several forms of awareness, independently of each other. Thus, steps 210-230 may be performed in any order and are not dependent on each other. Process 200 specifies how a symbol-based information system gains the information capabilities of awareness and self-awareness, establishing the structures and processing rules supporting the various types of awareness. By establishing how a system gains the capabilities of awareness, disclosed implementations provide an infrastructure of awareness that can be implemented in any number of intelligent information systems.

Figure 3A:
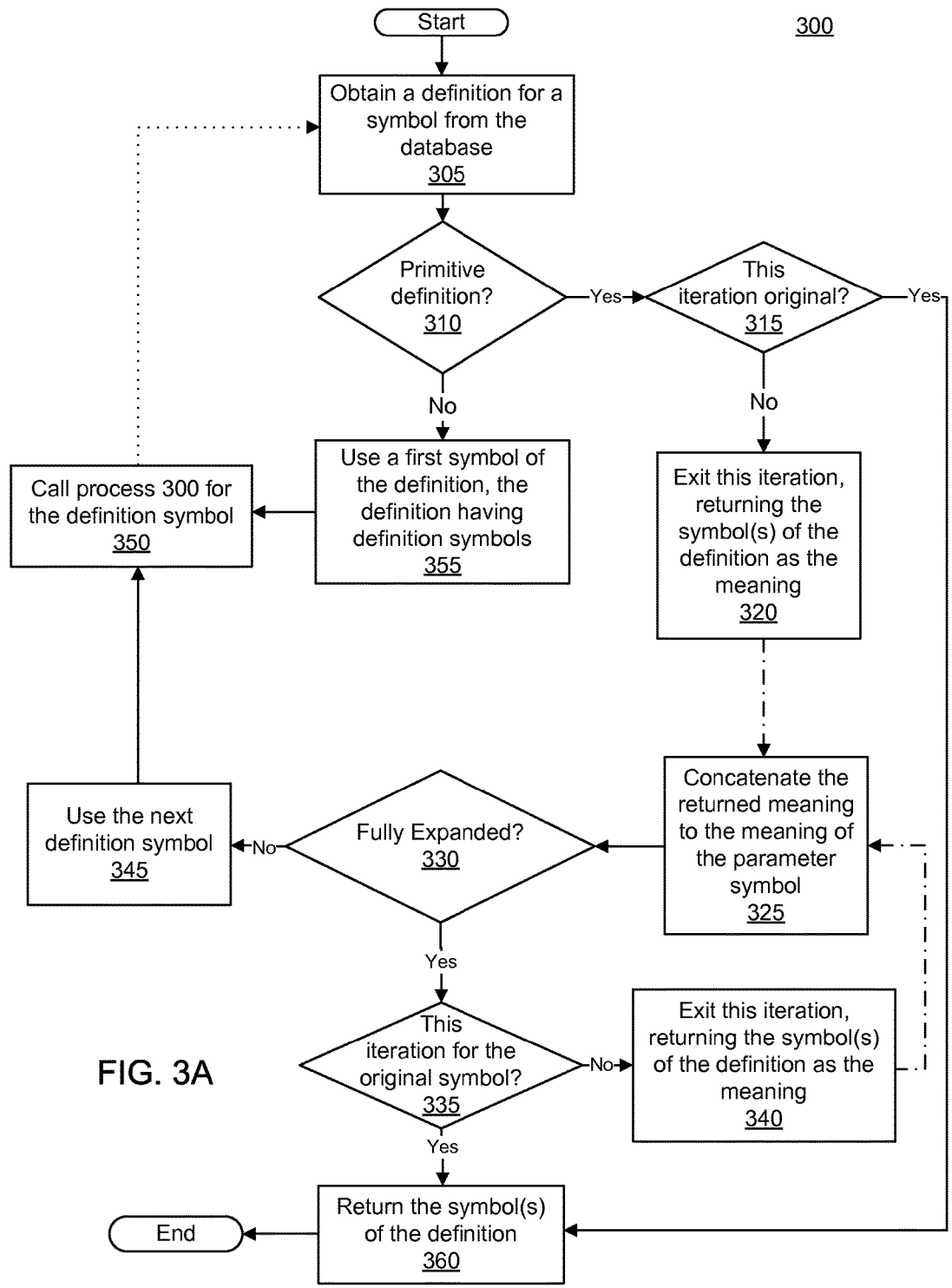
FIG. 3A is a flowchart illustrating an example process for acquiring the forms of awareness, according to an implementation.

FIG. 3A is a flowchart illustrating an example iterative process 300 for acquiring awareness, according to an implementation. Process 300 may be an awareness algorithm performed by an awareness engine as part of any of steps 210-230 of FIG. 2. Process 300 allows a symbol-based information system to acquire various forms of awareness, depending on the symbol used to initiate the process. The awareness engine may first obtain a definition for a particular symbol from the database (305). The particular symbol may be any of the symbols that comprise the symbol-based information system, as defined by the database. For the purposes of discussing FIG. 3A, the particular symbol may be referred to as the original parameter symbol, or the symbol that initiated the process. The awareness engine may then determine if the definition is a primitive definition (310). A definition is primitive if it can be expanded no further. A definition may be expanded no further if it includes only its corresponding symbol in its definition, for example if the definition of the parameter symbol includes the parameter symbol itself. In some implementations, definitions may be marked or flagged as primitive in the database. Any conventional or later discovered manner of marking the definition as primitive may be used. If the definition is primitive (310, Yes), the awareness engine may have determined the meaning of the symbol. If the current iteration of process 300 is the original iteration (315, Yes), the awareness engine may return the symbol(s) of the definition as the meaning of the original parameter symbol (360) and process 300 ends, having determined the meaning of the original parameter symbol.

If the definition is not primitive (310, No), the awareness engine may iteratively call the awareness algorithm to determine the meaning of the symbols in the definition. For example, the awareness engine may select a first symbol from the definition (355) and call process 300 for the selected symbol (350). The selected symbol thus becomes the parameter symbol for the next iteration of process 300. The dotted line from 350 to 305 represents the iterative call in FIG. 3A. Process 300 may then begin for the selected symbol, which is now the parameter symbol for the current iteration. Thus, the awareness engine may obtain the definition from the database (305) and determine whether it is primitive (310). If the definition is primitive (310, Yes), the awareness module may exit the iteration because this iteration is not the original iteration (315, No) and return the symbol(s) of the definition as the meaning (320). The dot-dashed line in FIG. 3A between 320 and 325 represents the conclusion of the current iteration, returning the meaning to the calling iteration. The calling iteration thus becomes the current iteration. The awareness engine may concatenate the returned meaning of the symbol to the meaning of the parameter symbol (325) and determine whether the definition of the parameter symbol is fully expanded (330). For example, if the current iteration is the original iteration, and the original parameter symbol had a definition that included two symbols, and only the first symbol was expanded, the definition is not fully expanded (330, No). Thus, the awareness module will select the next definition symbol (345) and call process 300 for the next symbol (350). Thus, the awareness engine may iteratively invoke the awareness algorithm to determine the meanings of the symbols used in the definitions.

When a definition for a symbol is fully expanded (330, Yes), if the iteration is not the original iteration (335, No), the awareness module may end the iteration, passing the meaning of the symbol to the previous, or calling, iteration (340). The dot-dashed line in FIG. 3A between 340 and 325 represents the conclusion of the current iteration, returning the meaning to the calling iteration, making the calling iteration the current iteration. Once the symbols of the definition of the original symbol have all been fully expanded (330, Yes) and (335, Yes), the awareness engine may return the symbol(s) of the definition as the meaning of the original parameter symbol (360) and process 300 may end. FIG. 3B is pseudo-code illustrating an example iterative process for acquiring awareness, according to an implementation. The pseudo-code of FIG. 3B is an example implementation of the awareness algorithm, which is also illustrated in FIG. 3A.

The iterative nature of the awareness algorithm represented by FIGS. 3A and 3B is illustrated using FIGS. 4-9. FIG. 4 illustrates an example database supporting an informational system of awareness, according to an implementation. The database of FIG. 4 includes symbols 142, definitions 144, and rules 146. The symbols, definitions, and rules illustrated in FIG. 4 are limited for the sake of brevity and it is understood that the system may include any number of symbols, definitions, and rules. Furthermore, although not shown in FIG. 4, a rule may also have a definition in the database so that a rule can have a meaning defined in terms of other rules and symbols. The database of FIG. 4 may be an example of data store 140 of FIG. 1. As shown in FIG. 4, the symbols 142 may include special symbols $S_{AWARE}$, $S_{ALGO}$, $S_{SYSTEM}$, $S_{AWARE/1}$, $S_{AWARE/ALGO}$, $S_{AWARE/SYSTEM}$, etc., which enable certain forms of awareness. FIGS. 5-9 illustrate examples of using the awareness algorithm to acquire various forms of awareness. Primitive definitions are circled in FIGS. 5-9 to assist with identification.

Figure 5:
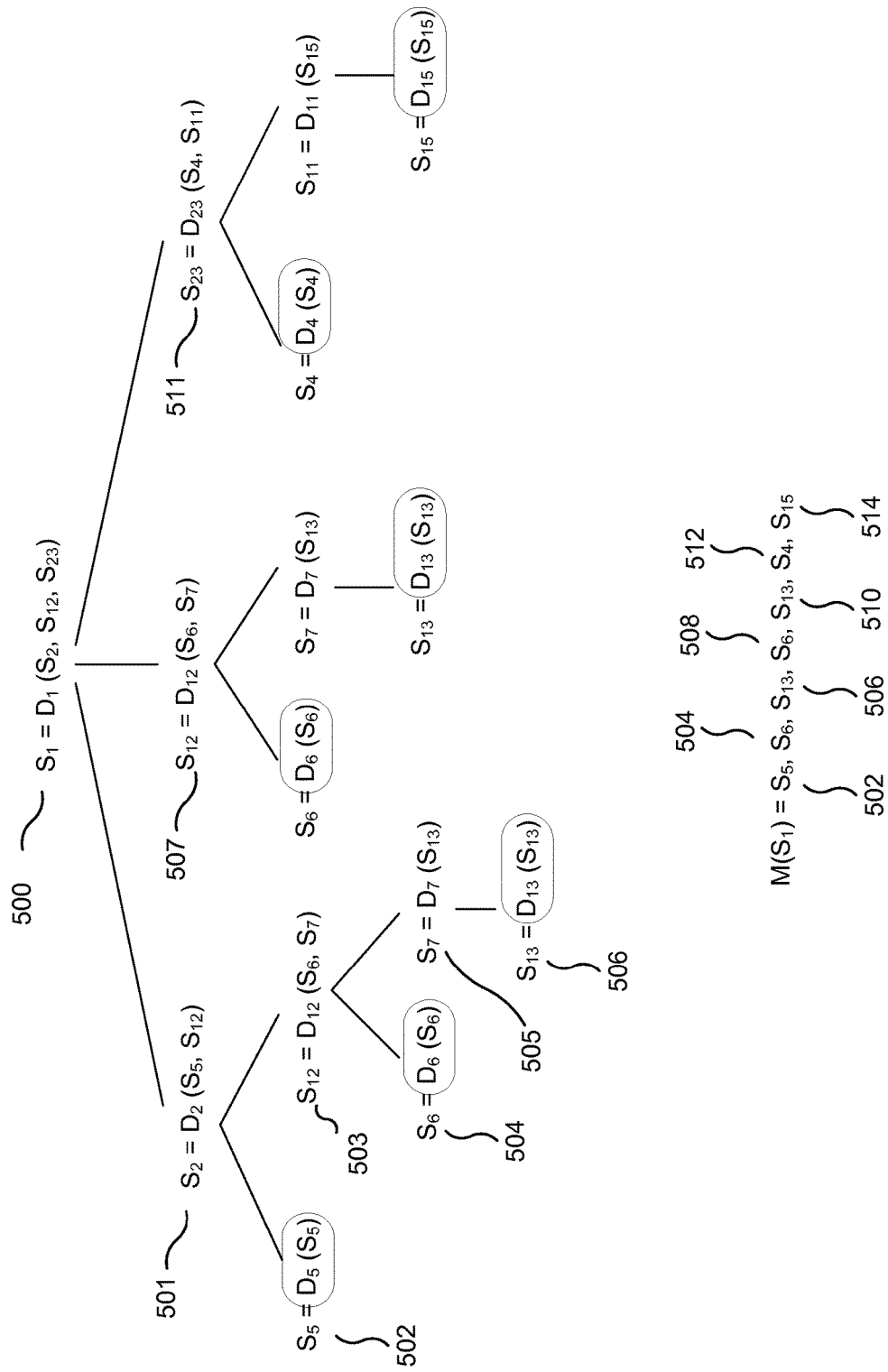
FIG. 5 is an example of acquiring awareness of a symbol using the process for acquiring awareness and the data store of FIG. 4.

FIG. 5 is an example of acquiring awareness of symbol $S_1$ from data store 140 using the awareness algorithm illustrated in FIGS. 3A and 3B. Item 500 represents the original invocation of process 300 for symbol $S_1$. The awareness engine may obtain the definition $D_1$ of $S_1$ from the database, which includes three symbols $S_2$, $S_{12}$, and $S_{23}$. This definition is not primitive, so the awareness engine may invoke the awareness algorithm for the first symbol $S_2$. This iteration is marked by item 501 in FIG. 5. The awareness engine may obtain the definition $D_2$ for symbol $S_2$, which includes the symbols S5 and $S_{12}$. Because this definition is also not primitive, the awareness engine may use the awareness algorithm to obtain the definition of the first symbol $S_5$. This iteration is marked as item 502 in FIG. 5. The awareness engine may obtain the definition $D_5$ for symbol $S_5$ from the database. This definition is primitive because the definition includes the $S_5$ symbol itself. The awareness engine may return the definition of $S_5$ as a meaning for $S_5$ to iteration 501. The returned symbol (e.g., $S_5$) is concatenated to the meaning of $S_2$, and the awareness module determines whether the definition for $S_2$ is fully expanded. Because $S_{12}$ has not been expanded, the awareness module calls the awareness algorithm for $S_{12}$, invoking iteration 503 of FIG. 5. The definition of $S_{12}$ is not primitive, thus causing the awareness engine to invoke iterations 504 and 505, and iteration 505 causes the awareness engine to invoke iteration 506. When the meaning of $S_{12}$ is fully expanded, for example to $<S_6, S_{13}>$, this meaning is passed back to iteration 501, which passes the meaning of $S_2$, namely $<S_5, S_6, S_{13}>$, to iteration 500. This iterative process continues until iteration 500 receives the meaning of $S_{12}$ (namely $<S_6, S_{13}>$) and $S_{23}$ (namely $<S_4, S_{15}>$). As each meaning is returned it is concatenated to form the meaning of $S_1$. Thus, the awareness algorithm determines that the meaning $M_1$ of $S_1$ is $<S_5, S_6, S_{13}, S_6, S_{13}, S_4, S_{15}>$. By determining the meaning of $S_1$, the information system has become aware of $S_1$.

FIG. 6 is an example of the system acquiring awareness of being aware using the awareness algorithm illustrated in FIGS. 3A and 3B. As discussed above, the system becomes aware of being aware by determining the meaning of the special symbol $S_{AWARE}$. Thus in the example of FIG. 6, $S_{AWARE}$ is the parameter symbol for process 300. The awareness engine obtains the definition $D_{AWARE}$ from the database, which is the symbol $S_{ALGO}$, the symbol representing the algorithm of awareness. The definition of $S_{ALGO}$ may be the processing rules that comprise the awareness algorithm. Thus, the meaning of $S_{AWARE}$ (represented by $M(S_{AWARE})$ in FIG. 6) is the fully expanded definition of $S_{ALGO}$ which are the processing rules $R_1$, $R_2$, $R_3$. As Stated previously, we can represent the system's capability to be aware of its awareness by $S_{AWARE/ALGO}$.

FIG. 7 is an example application of acquiring awareness of the descriptive information of the system using the awareness algorithm and the data store of FIG. 4. As discussed above, the system becomes aware of its content by determining the meaning of the special symbol $S_{SYSTEM}$. The definition of $S_{SYSTEM}$ includes all the data of the data store, as illustrated by the definition $D_{SYSTEM}$ in FIG. 4. Thus, once the system establishes the meaning of $S_{SYSTEM}$, it is aware of its content. It is noted that the meaning of $S_{SYSTEM}$ (represented by $M(S_{SYSTEM})$) illustrated in FIG. 7 is truncated for the sake of brevity. It is understood that the meaning of $S_{SYSTEM}$ may be determined by determining the meaning of each symbol in $D_{SYSTEM}$ using the awareness algorithm. In other words, using the examples of FIGS. 5, 6, 8, and 9 it is apparent how the system may reduce the definition of $S_{SYSTEM}$ to primitives, to establish the meaning of $S_{SYSTEM}$.

FIG. 8 is an example application of acquiring awareness of the capability to be aware of the meaning of symbol $S_1$. As discussed above, the system becomes aware of a symbol by appropriately applying the processing rules to establish the meaning of a symbol. The database may also include a symbol awareness symbol for one or more of the symbols in the database. The symbol awareness symbol may represent the information system's capability to be aware of the particular symbol. For example, symbol $S_{AWARE/1}$ may represent the information system's capability to be aware of the $S_1$ symbol and $S_{AWARE/5}$ may represent the information system's capability to be aware of the $S_5$ symbol, etc. The meaning of $S_{AWARE/1}$ may be the means through which the system gains awareness of $S_1$, or the application of the awareness algorithm to symbol $S_1$. Thus the definition of $S_{AWARE/1}$ may be another symbol $S_{ALGO/1}$, which represents the application of the processing rules to symbol $S_1$. (e.g., $S_1 \rightarrow R_1, R_2, R_3$). While FIG. 8 illustrates an example using $S_1$, this approach can be applied to any of the system's symbols.

FIG. 9 is an example application of acquiring awareness ad infinitum. As discussed above, the system becomes aware of being aware through application of the awareness algorithm to symbol $S_{AWARE}$, which has a meaning that is the awareness algorithm. The database of the informational system may also include a number of aware of awareness symbols, such as $S_{AWARE/ALGO}$ and $S_{AWARE/AWARE/ALGO}$. For example, and as seen before, $S_{AWARE/ALGO}$ may be defined to represent that the system has the capability to be aware of its awareness. Thus, in computing the meaning of $S_{AWARE/ALGO}$ the system becomes aware of its awareness of its awareness which can be represented by $S_{AWARE/AWARE/ALGO}$. The meaning of $S_{AWARE/ALGO}$ represents the application of the processing rules to symbol $S_{ALGO}$, which has a definition of the processing rules (e.g., the meaning is the processing rules applied to the processing rules or $R_1$, $R_2$, $R_3 \rightarrow R_1$, $R_2$, $R_3$). While FIG. 9 illustrates an example using $S_{AWARE/ALGO}$, this approach can be applied to any degree of awareness of awareness.

Figure 10:
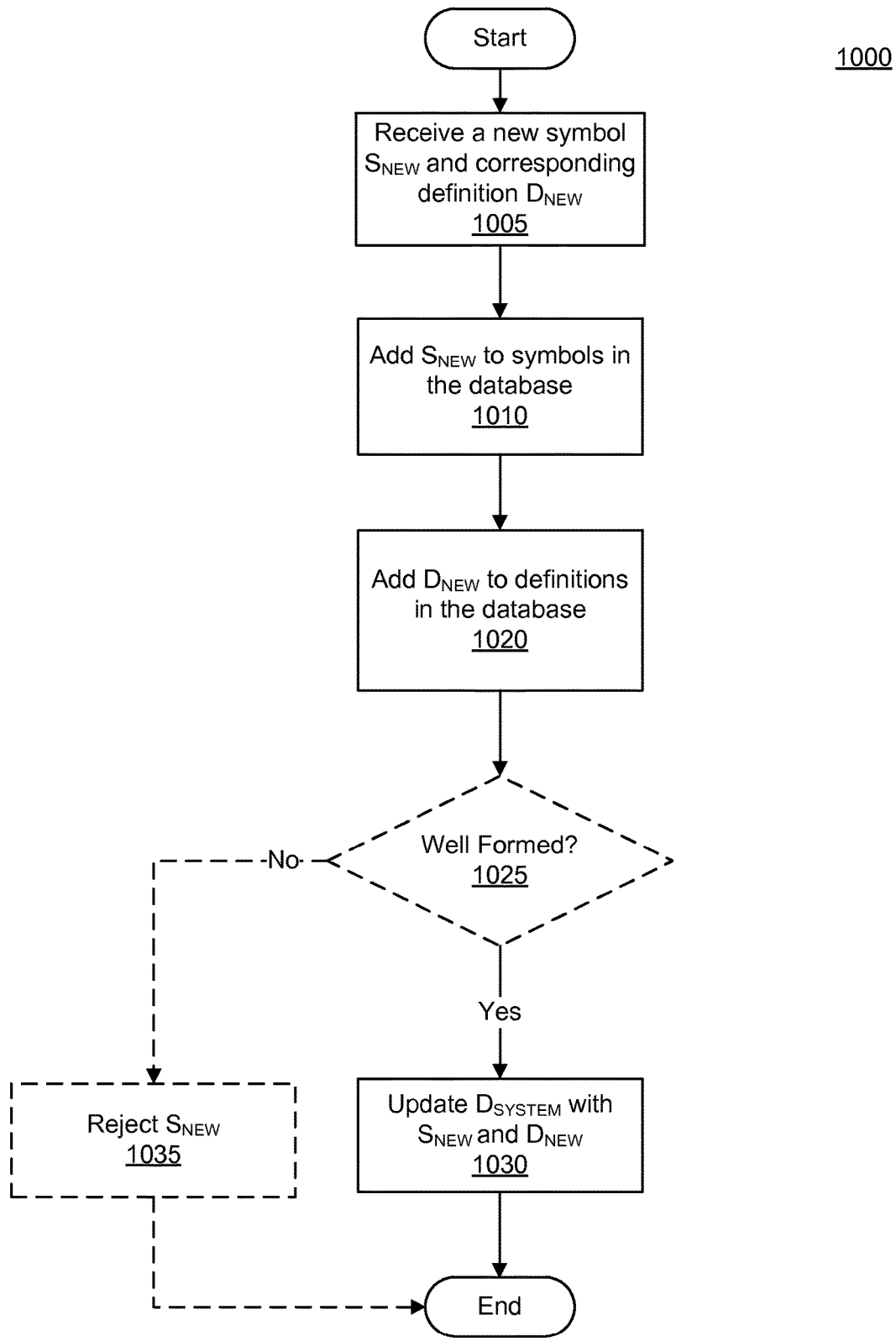
FIG. 10 is an example process for adding a new symbol to the data store, according to an implementation.

FIG. 10 is an example process 1000 for adding a new normal symbol to the database, according to an implementation. Process 1000 may be performed by an interface, such as interface 120 of FIG. 1, or some other module of computing device 10 of FIG. 1. The interface may receive a new symbol and its corresponding definition to add to the database (1005). For the purposes of discussion, the symbol may be referred to as $S_{NEW}$. In some implementations, the new symbol may be received from an intelligent system. The intelligent system may have appropriately transformed the symbol into a form able to be processed by the system. In other words, the intelligent system may have ensured that the new symbol and its definition are formatted to be processed by a descriptive information system, such as computing device 100 of FIG. 1.

The $S_{NEW}$ symbol may be added to the symbols 142 in the database (1010) and add the definition of $S_{NEW}$ to the definitions in the database (1020). In some implementations, the awareness module may be deployed to verify that the new symbol and its definition are well formed (1025). This step is optional because the process that produces the new symbol and definition, e.g., an intelligent system, may have already ensured the symbol is well formed. If the symbol is not well formed (1025, No), the awareness engine may reject the symbol (1035). In rejecting the symbol the awareness engine may generate a notification, may delete the symbol from the database, may place the symbol in a holding queue, or take another or additional appropriate action. If the symbol is well formed (1025, Yes), the awareness engine may update the definition of the $S_{SYSTEM}$ symbol with the $S_{NEW}$ symbol (1030). This is because the definition of the $S_{SYSTEM}$ symbol needs to include all symbols, definitions, and rules, or the system cannot be fully aware of its content. Process 1000 may then end, or may process another new symbol. In some implementations after all new symbols have been added, the system may invoke process 300 with the $S_{SYSTEM}$ symbol to ensure it is aware of all of its content.

Implementations of the various techniques described herein may be implemented in digital electronic circuitry, or in computer hardware, firmware, software, or in combinations of them. Implementations may implemented as a computer program product, i.e., a non-transitory computer program tangibly embodied in a machine-readable storage device (e.g., a computer-readable medium that does not include a transitory signal), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks, but exclude transitory propagating signals. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse, touchpad, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include connections based on various protocols such as Internet Protocol (IP) and/or a proprietary protocol (e.g., Systems Network Architecture—SNA).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
at least one processor;
a data store storing symbols, including normal symbols and special symbols, storing definitions of symbols, and storing processing rules, wherein each normal symbol has a respective definition that is either the normal symbol itself or at least one other normal symbol and each special symbol has a respective definition that is at least one other special symbol or at least one of the processing rules, and the special symbols include an awareness symbol; and
a memory storing instructions that, when executed by the at least one processor, cause the system to execute processing rules in the definition of the awareness symbol reduced to primitives, which cause the system to perform operations including:
acquiring a first awareness of a particular symbol from the data store by reducing the respective definition of the particular symbol to primitives, the first awareness being an awareness of the particular symbol, and acquiring a second awareness by reducing the respective definition of the awareness symbol to primitives, the second awareness being an awareness that the system is aware.

2. The system of claim 1, wherein reducing the respective definition of the particular symbol to primitives includes:
   a) obtaining the respective definition of the particular symbol from the data store, the respective definition including at least one other symbol; and
   b) if the respective definition is not already primitive:
      i) obtaining the respective definition for the at least one other symbol in the first definition, and
      ii) reducing the respective definition for the at least one other symbol to primitives when the respective definition for the at least one other symbol is not primitive,
   wherein by reducing the particular symbol to primitives the system establishes the meaning of the particular symbol and acquires awareness of the particular symbol.

3. The system of claim 2, wherein the particular symbol is the awareness symbol, and acquiring the first awareness using the awareness symbol causes the system to acquire the second awareness.

4. The system of claim 1, wherein the processing rules are marked as primitive in the data store.

5. The system of claim 1, wherein a primitive includes a symbol that has a corresponding definition that is the symbol itself.

6. The system of claim 1, wherein a respective definition of at least one symbol is marked as primitive in the data store.

7. The system of claim 1, wherein the particular symbol is a database symbol and a meaning of the database symbol includes the symbols, definitions, and processing rules in the data store.

8. The system of claim 1, wherein the data store stores a database special symbol and acquiring the first awareness using the database symbol causes the system to acquire a third awareness, the third awareness being an awareness of the system's information content.

9. The system of claim 8, wherein the system acquires self-awareness as a result of acquiring the second awareness and the third awareness.

10. The system of claim 8, the memory further storing instructions that, when executed by the at least one processor, cause the system to perform operations comprising:
   receive a new symbol and a corresponding symbol definition;
   update the data store with the new symbol and the corresponding symbol definition; and
   update a definition of the database special symbol to include the new symbol and the corresponding symbol definition.

11. The system of claim 1, wherein the data store further stores a symbol awareness symbol for at least one symbol, and the particular symbol is the symbol awareness symbol, and the memory further stores instructions that, when executed by the at least one processor, cause the system to acquire the first awareness using the symbol awareness symbol for the at least one symbol, which results in the system acquiring a fourth awareness, the fourth awareness being awareness of the capability to be aware of a meaning of the at least one symbol.

12. The system of claim 1, wherein the data store further stores an aware of awareness symbol, and the particular symbol is the aware of awareness symbol, and the memory further stores instructions that, when executed by the at least one processor, cause the system to acquire the first awareness using the aware of awareness symbol, which results in the system acquiring a fifth awareness, the fifth awareness being awareness of being aware of being aware.

13. A computer-implemented method by which an information system gains capabilities of awareness, the method comprising:
   accessing, using a processor of the information system, a data store that includes normal symbols and special symbols, definitions of symbols, and processing rules, wherein each normal symbol has a respective definition that is either the normal symbol itself or at least one other normal symbol and each special symbol has a respective definition that is at least one other special symbol or at least one of the processing rules, and the special symbols include an awareness symbol; and
   acquiring awareness of at least one symbol from the data store by executing processing rules in the definition of the awareness symbol reduced to primitives, which cause the system to:
      a) obtain a first definition of the symbol from the data store, the first definition including at least one other symbol from the data store, and
      b) establish a meaning of the symbol by reducing the first definition to primitives, wherein reducing the definition to primitives includes:
         i) obtaining a second definition for the at least one other symbol in the first definition, and
         ii) reducing the second definition to primitives if the second definition is not primitive,
      wherein a definition for a particular symbol is primitive when the definition is the particular symbol or the definition is marked as primitive in the data store.

14. The method of claim 13, wherein the at least one symbol is the awareness symbol, and by acquiring awareness of the awareness symbol, the information system acquires awareness of its being aware.

15. The method of claim 13, wherein the processing rules are marked as primitive in the data store.

16. The method of claim 13, wherein the special symbols include a database special symbol and the at least one symbol is the database symbol, and by acquiring awareness of the database symbol, the information system acquires awareness of all its content.

17. The method of claim 16, wherein the definition of the database special symbol reduces to the symbols, definitions, and processing rules included in the data store.

18. The method of claim 13, wherein at least one definition for a normal symbol is primitive when the definition is marked as primitive in the data store.

19. The method of claim 13, wherein the data store further includes a symbol awareness symbol corresponding to a particular symbol and the at least one symbol is the symbol awareness symbol and, by acquiring awareness of the symbol awareness symbol, the information system acquires awareness of the capability to be aware of the meaning of the particular symbol.

20. The method of claim 13, wherein the data store further includes an aware of awareness symbol and the at least one symbol is the aware of awareness symbol, and by acquiring awareness of the aware of awareness symbol, the information system acquires awareness of being aware of being aware of.

* * * * *